United States Patent
Tian et al.

(10) Patent No.: US 9,734,482 B2
(45) Date of Patent: Aug. 15, 2017

(54) WAREHOUSE DATA PROCESSING SYSTEM AND METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Zhiming Tian, Beijing (CN); Jianmin Wu, Beijing (CN); Xieming Su, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/896,799

(22) PCT Filed: Jun. 23, 2015

(86) PCT No.: PCT/CN2015/082016
§ 371 (c)(1),
(2) Date: Dec. 8, 2015

(87) PCT Pub. No.: WO2016/095469
PCT Pub. Date: Jun. 23, 2016

(65) Prior Publication Data
US 2016/0342938 A1    Nov. 24, 2016

(30) Foreign Application Priority Data
Dec. 16, 2014  (CN) .......................... 2014 1 0784087

(51) Int. Cl.
*G06F 19/00*   (2011.01)
*G06Q 10/08*   (2012.01)
(Continued)

(52) U.S. Cl.
CPC ...... *G06Q 10/087* (2013.01); *G06F 17/30345* (2013.01); *G06K 7/10861* (2013.01); *G06Q 50/28* (2013.01)

(58) Field of Classification Search
CPC ................ G06Q 50/28; G06K 7/10861; G06F 17/30345
(Continued)

(56) References Cited

U.S. PATENT DOCUMENTS 6,496,806 B1 * 12/2002 Horwitz ............. G06K 17/0029
340/10.1
7,246,706 B1 * 7/2007 Shakes ...................... B07C 7/02
209/614
(Continued)

FOREIGN PATENT DOCUMENTS

CN    101866448 A    10/2010
CN    202183122 U    4/2012
(Continued)

OTHER PUBLICATIONS

International Search Report & Written Opinion Appln. No. PCT/CN2015/082016: Dated Sep. 23, 2015.
(Continued)

*Primary Examiner* — Claude J Brown
(74) *Attorney, Agent, or Firm* — Ladas & Parry LLP

(57) ABSTRACT

A warehouse data processing system including a handheld terminal and a database server, wherein the handheld terminal is connected with the database server, the handheld terminal is used to scan goods information and/or stock location codes, acquire stock data including the goods information and/or the stock location codes from the database server, and perform warehouse data processing on the stock data according to the scanned goods information and/or stock location codes. The warehouse data processing
(Continued)

is achieved in a mobile and portable manner by using the handheld terminal to scan goods information and/or stock location codes and performing warehouse data processing on the stock data according to the scanned goods information and/or stock location codes.

14 Claims, 4 Drawing Sheets

(51) Int. Cl.
    *G06F 17/30*     (2006.01)
    *G06K 7/10*     (2006.01)
    *G06Q 50/28*     (2012.01)

(58) Field of Classification Search
    USPC .......................................................... 235/385
    See application file for complete search history.

(56) References Cited

U.S. PATENT DOCUMENTS

| | | | |
|---|---|---|---|
| 7,683,786 B2* | 3/2010 | Kaoru .................... | A45C 15/00 340/572.1 |
| 8,090,632 B1* | 1/2012 | Ortiz .................... | G06Q 10/087 705/28 |
| 2002/0130778 A1* | 9/2002 | Nicholson ............ | B65D 5/4233 340/572.1 |
| 2004/0002305 A1* | 1/2004 | Byman-Kivivuori | G06Q 20/353 455/41.2 |
| 2006/0012481 A1* | 1/2006 | Rajapakse .............. | G06Q 10/00 340/572.1 |
| 2006/0192652 A1* | 8/2006 | Mandava ............. | G06K 7/0008 340/5.8 |
| 2007/0203808 A1* | 8/2007 | Sekimoto ............. | G06Q 10/087 705/28 |
| 2008/0000960 A1* | 1/2008 | Outwater ............... | G06Q 10/08 235/375 |
| 2008/0033368 A1* | 2/2008 | Fago .................. | A61M 5/14546 604/189 |
| 2008/0116269 A1* | 5/2008 | Dearing ............. | G06K 7/10336 235/385 |
| 2010/0127875 A1* | 5/2010 | Wong ................... | G06K 7/0008 340/572.7 |
| 2011/0095872 A1* | 4/2011 | Bhadriraju ........... | G06Q 10/087 340/10.52 |
| 2014/0184391 A1* | 7/2014 | Elizondo, II ....... | G06K 7/10356 340/10.1 |
| 2014/0339296 A1 | 11/2014 | McAdams et al. | |
| 2015/0206095 A1* | 7/2015 | De Boer ................ | G06Q 10/06 705/28 |

FOREIGN PATENT DOCUMENTS

| | | |
|---|---|---|
| CN | 102629350 A | 8/2012 |
| CN | 102663576 A | 9/2012 |
| CN | 103049839 A | 4/2013 |
| CN | 203084773 U | 7/2013 |
| CN | 104463545 A | 3/2015 |

OTHER PUBLICATIONS

The First Chinese Office Action dated Jun. 9, 2017; Appln. No. 201410784087.6.

* cited by examiner

WAREHOUSE DATA PROCESSING SYSTEM AND METHOD

TECHNICAL FIELD OF THE DISCLOSURE

The present disclosure relates to the field of data processing technologies, and in particular to a warehouse data processing system.

BACKGROUND

The intelligent warehousing system, as known by the inventor(s), comprises electronic tags, readers, an application system and connection lines, wherein the application system includes the following subsystems: a data management subsystem, a warehouse-entry subsystem, a cart-type intelligent inventorying subsystem, a stock-transfer subsystem and a Ex-warehouse subsystem. The above subsystems are connected through connection lines. The data management system is configured to enter goods information or materials and create RFID (Radio Frequency Identification) electronic tags corresponding thereto in a one-to-one manner. The electronic tags are corresponding to related goods information. If the related information is correct, the RFID electronic tags are stuck or hung on the goods or materials to allow for warehouse-entry. The intelligent warehousing system can achieve inventorying, Ex-warehouse and warehouse-entry of goods in the warehouse in time.

In the data management system, a warehouse database is a database to be built in advance. The data stored in the database comprises an outer package code of goods, an inner package code of goods, a code of goods, a stock location code, and information on correspondence relations among the above codes. The information on correspondence relations comprises the information on the relation between the outer package code of goods and the stock location code (the stock location where the outer package is stored in the warehouse; one outer package is corresponding to one stock location), the information on the relation between the outer package code of goods and the inner package code of goods (the number of inner packages stored in the outer package, and a sign on whether the inner package and the outer package are full, wherein one outer package is corresponding to multiple inner packages, and one inner package can only be stored in one outer package), the information on the relation between the inner package code of goods and the code of goods (the number of goods stored in the inner package, and the goods and a sign on whether the inner package is completely full, wherein one inner package is corresponding to a plurality of goods, and one piece of goods can only be stored in one inner package), and a record on whether a stock location is occupied.

Usually, the warehouse data processing comprises operations such as stock-transfer, inventorying, checking and the like on the stock data in the warehouse database. However, the intelligent warehousing system known by the inventor is a system developed for the management of the warehouse. The operations such as stock-transfer, inventorying and checking are still carried out by manual recording and then being operated in the system to realize warehouse data processing. It can be seen that such a known solution cannot realize warehouse data processing on the warehouse data in a wireless, mobile and portable manner.

SUMMARY

The present disclosure can realize warehouse data processing in a mobile and portable manner.

Accordingly, the present disclosure provides a warehouse data processing system, comprising a handheld terminal and a database server, wherein the handheld terminal is connected with the database server, the handheld terminal is used to scan goods information and/or stock location codes, acquire stock data including the goods information and/or the stock location codes from the database server, and perform warehouse data processing on the stock data according to the scanned goods information and/or stock location codes.

Optionally, the handheld terminal comprises a code-scanning unit and a data processing unit connected to the code-scanning unit, wherein the code-scanning unit is used to transmit the scanned goods information and/or stock location codes to the data processing unit, the data processing unit is connected to the database server to perform warehouse data processing on the stock data according to the scanned goods information and/or stock location codes, and transmits the processed result to database server to update the data in the database server.

Optionally, the goods information comprises at least one of an outer package code of goods, an inner package code of goods and a goods code.

Optionally, the data processing unit comprises a stock-transfer unit connected to the code-scanning unit, wherein the stock-transfer unit is used to send a stock-transfer instruction to the code-scanning unit, the code-scanning unit scans an outer package code of goods to be transferred and a new stock location code, and transmits the goods outer package code of the goods to be transferred and the new stock location code to the stock-transfer unit, the stock-transfer unit transmits the outer package code of goods and the new stock location code to the database server to make the database server update the previous stock location code in the stock data corresponding to the outer package code of goods to the new stock location code.

Optionally, the stock-transfer unit is also used to query whether the new stock location code is identified as an occupied state in the database server before transmitting the outer package code of goods and the new stock location code to the database server, and if it is identified, the code-scanning unit is triggered to re-scan a new stock location code until a stock location code which is not identified as an occupied state is scanned.

Optionally, the data processing unit comprises an inventorying unit connected to the code-scanning unit, wherein the inventorying unit is used to send an inventorying instruction to the code-scanning unit, the code-scanning unit scans the goods outer package code of goods and the goods inner package code of goods and sends them to the inventorying unit, the inventorying unit establishes a package relation record corresponding to the fact that the inner package code of goods belongs to the outer package code of goods, generates a temporary datasheet comprising the outer package code of goods, the inner package code of goods and the package relation record, acquires a currently stored stock datasheet comprising the outer package code of goods, the inner package code of goods and the package relation record from the database server, compares the temporary datasheet and the stock datasheet, and if there is a difference, generates a difference report.

Optionally, after the inventorying unit receives the outer package code of goods sent from the code-scanning unit, the inventorying unit queries whether the corresponding outer package is full in the database server, if it is full, the code-scanning unit is triggered to randomly scan one inner package code of goods within the outer package, and derives inner package codes of all the goods corresponding to the outer package code of goods from the database server; otherwise, the code-scanning unit is triggered to scan the inner package codes of all the goods within the outer package one by one, and sends the inner package codes of all the goods within the outer package to the inventorying unit.

Optionally, the data processing unit comprises a check unit connected to the code-scanning unit, wherein the check unit is used to send a check instruction to the code-scanning unit, the code-scanning unit transmits the scanned outer package code of goods, the inner package code of goods and goods code to the check unit, the check unit queries in the database server, determines whether the packaging relation record of the scanned outer package code of goods, inner package code of goods and the goods code is consistent with the packaging relation record in the database, and if inconsistent, it prompts packaging error information.

Optionally, after the check unit receives the outer package code of goods and the inner package code of goods sent from the code-scanning unit, the check unit queries whether the packaging relation between the outer package code of goods and the inner package code of goods is correct in the database server, if correct, it prompts a check failure, and if incorrect, queries whether the inner package is full; if it is full, it prompts that the check is successful, if it is not full, the code-scanning unit is triggered to scan all the goods codes in the inner package one by one and determines whether the packaging relation between the goods and the inner package is correct; if correct, it prompts that the check is successful, otherwise, prompts a check failure.

Optionally, the code-scanning unit is also used to determine whether the scanned code exists in the database server after the scanning is completed; and if not exists, it reports an error and triggers further scanning.

Optionally, the handheld terminal is a palm computer, a pad computer or a smart phone.

According to another aspect of the present disclosure, there is also provided a warehouse data processing method, comprising: scanning goods information and/or stock location codes; acquiring stock data including the goods information and/or the stock location codes from the database server; and performing warehouse data processing on the stock data according to the scanned goods information and/or stock location codes.

Optionally, the goods information comprises at least one of an outer package code of goods, an inner package code of goods and a goods code.

Optionally, the above warehouse data processing method further comprises: scanning an outer package code of goods to be transferred and a new stock location code according to a stock transfer instruction; and transmitting the outer package code of goods and the new stock location code to the database server to make the database server update the previous stock location code in the stock data corresponding to the outer package code of goods to the new stock location code.

Optionally, the above warehouse data processing method further comprises: scanning the outer package code of goods and the inner package code of goods according to an inventorying instruction; establishing a package relation record corresponding to the fact that the inner package code of goods belongs to the outer package code of goods; generating a temporary datasheet comprising the outer package code of goods, the inner package code of good and the package relation record; acquiring a currently stored stock datasheet comprising the outer package code of goods, the inner package code of goods and the package relation record from the database server; and comparing the temporary datasheet and the stock datasheet, and if there are differences, generating a difference report.

Optionally, the above warehouse data processing method further comprises: scanning an outer package code of goods, an inner package code of goods and the goods code according to a check instruction; and determining whether the packaging relation record including the scanned outer package code of goods, inner package code of goods and the goods code is consistent with the packaging relation record in the database, and if inconsistent, prompting packaging error information.

The present disclosure realizes warehouse data processing in a mobile and portable manner by using the handheld terminal to scan goods information and/or stock location codes and performing warehouse data processing on the stock data according to the scanned goods information and/or stock location codes.

DETAILED DESCRIPTION

In the following, implementations of the present disclosure will be further described in detail in connection with figures and embodiments. The following embodiments are used to describe the present disclosure but not limit the scope of the present disclosure.

Figure 1:
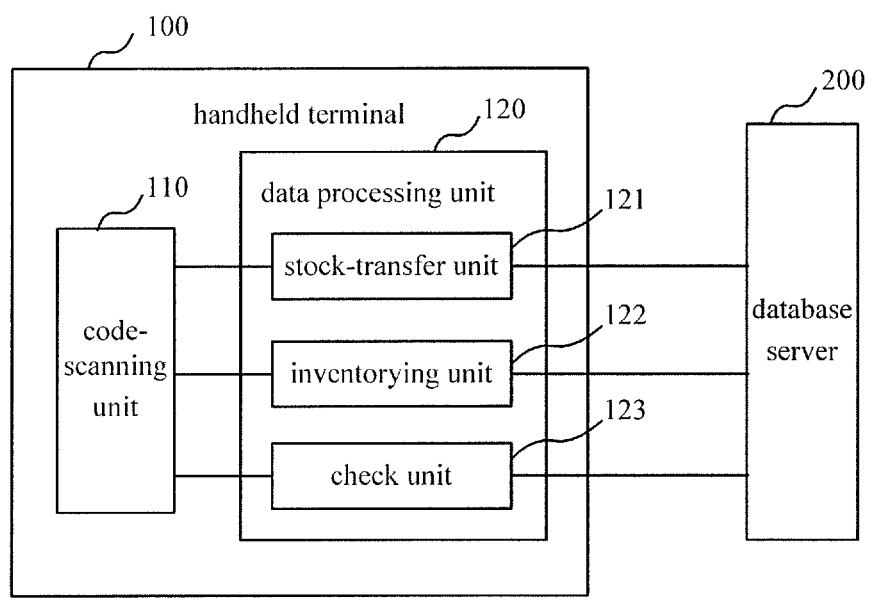
FIG. 1 is a schematic structural diagram of a warehouse data processing system according to an embodiment of the present disclosure.

As shown in FIG. 1, a warehouse data processing system of an embodiment of the present disclosure comprises a handheld terminal 100 and a database server 200. The handheld terminal 100 is connected with the database server 200. The handheld terminal 100 is used to scan goods information and/or stock location codes, acquire stock data including the goods information and/or the stock location codes from the database server 200, and perform warehouse data processing on the stock data according to the scanned goods information and/or stock location codes in order to update or validate the stock data in the database server 200. Optionally, the goods information comprises at least one of an outer package code of goods, an inner package code of goods and a code of goods.

The present embodiment realizes warehouse data processing in a mobile and portable manner by using the handheld terminal 100 to scan goods information and/or stock location codes and performing warehouse data processing on the stock data according to the scanned goods information and/or stock location codes. Preferably, the handheld terminal 100 is connected to the database server 200 wirelessly to realize wireless data transmission.

In the present embodiment, the handheld terminal 100 comprises a code-scanning unit 110 and a data processing unit 120 connected to the code-scanning unit 110. The code-scanning unit 110 is used to transmit the scanned goods information and/or stock location codes to the data processing unit 120. The data processing unit 120 is connected to the database server 200 to perform warehouse data processing on the stock data according to the scanned goods information and stock location codes.

In the present embodiment, the data processing unit 120 comprises a stock-transfer unit 121 connected to the code-scanning unit 110, wherein the stock-transfer unit 121 is used to send a stock-transfer instruction to the code-scanning unit 110, the code-scanning unit 110 scans an outer package code of goods to be transferred and a new stock location code, and transmits the outer package code of the goods to be transferred and the new stock location code to the stock-transfer unit 121. The stock-transfer unit 121 transmits the outer package code of goods and the new stock location code to the database server 200 to allow the database server 200 to update the previous stock location code in the stock data corresponding to the outer package code of goods to the new stock location code.

Further, in order to ensure the new scanned stock location is an available stock location (the stock location may be reserved or not be updated, and is labeled as an occupied state in the database record), the stock-transfer unit 121 is also used to query whether the new stock location code is labeled as an occupied state in the database server 200 before transmitting the outer package code of goods and the new stock location code to the database server 200, and if it is labeled, it triggers the code-scanning unit 110 to re-scan a new stock location code until a stock location which is not in an occupied state is scanned.

In the present embodiment, the data processing unit 120 may also comprise an inventorying unit 122 connected to the code-scanning unit 110, wherein the inventorying unit 120 is used to send an inventorying instruction to the code-scanning unit 110, the code-scanning unit 110 scans the outer package code of goods and the inner package code of goods and sends them to the inventorying unit 122, the inventorying unit 122 establishes a relation record corresponding to the fact that the inner package code of goods belongs to the package corresponding to the outer package code of goods (that is, the inner package corresponding to the inner package code of goods is within the outer package corresponding to the outer package code of goods), generates a temporary datasheet comprising the outer package code of goods, the inner package code of goods and the package relation record, acquires a currently stored stock datasheet comprising the outer package code of goods, the inner package code of goods and the package relation record from the database server 200, compares the temporary datasheet and the stock datasheet, and if there is a difference, generates a difference report. The inventorying unit 122 displays the difference report on an interface of the handheld terminal 100, and then an operator can find out the situation according to the difference report and take actions accordingly, such as adjusting actual packaging relation and then entering related data into the database.

Because the amount of the warehouse data is huge, if each piece of goods is inventoried, intensive access to the database should be performed, which reduces inventorying efficiency. Therefore, in order to improve inventorying efficiency, further, after the inventorying unit 122 receives the outer package code of goods sent from the code-scanning unit 110, the inventorying unit 122 queries whether the corresponding outer package is full in the database server 200, if it is full (the fact that the outer package is full means that it is not accessed after it is put into the warehouse, so corresponding data in the database should not be changed, and thus it is sufficient to randomly select and inventory one inner package therein or it is even possible not to scan inner packages, so as to reduce the number of times for accessing to the database; the fact that the outer package is not full means that it is accessed after being put into the warehouse, so corresponding data in the database is also modified, and thus it is prone to result in the inconsistency between the actual stock and the stock data in the database), the code-scanning unit 110 is triggered to randomly scan an inner package code of goods within the outer package, and derives the inner package codes of all the goods corresponding to the outer package code of goods from the database server 200 to generate the temporary data sheet; otherwise, the code-scanning unit 110 is triggered to scan inner package codes of all the goods within the outer package one by one, and sends the inner package codes of all the goods within the outer package to the inventorying unit 122.

In the present embodiment, the data processing unit 120 can further comprise a check unit 123 connected to the code-scanning unit 110, wherein the check unit 123 is used to send a check instruction to the code-scanning unit 110, the code-scanning unit 110 transmits the scanned outer package code of goods, the inner package code of goods and the goods code to the check unit 123, the check unit 123 queries in the database server 200, determines whether the packaging relation record of the scanned outer package code of goods, the inner package code of goods and the goods code is consistent with the packaging relation record in the database, and if inconsistent, it prompts error information on packaging. The inventorying unit 122 displays the error information on the interface of the handheld terminal 100, and then the operator can find out the situation according to the error information and take actions accordingly, such as adjusting actual packaging relation and then entering the related data into the database.

Further, after the check unit 123 receives the outer package code of goods and the inner package code of goods sent from the code-scanning unit 110, the check unit 123 queries in the database server 200 whether the packaging relation of the outer package code of goods and the inner package code of goods is correct, if incorrect, it prompts a check failure, and if correct, it queries whether the inner package is full; if it is full, it prompts that the check is successful, and if it is not full, it triggers the code-scanning unit 110 to scan all the goods codes in the inner package one by one and determines whether the packaging relation between the goods and the inner package is correct, if correct, it prompts that the check is successful, otherwise, prompts check failure. In such a way, it is possible to reduce the number of times for accessing to the database server 200 and improve check efficiency.

Further, in the above code-scanning procedure, in order to avoid the situation that the goods is inconsistent with the record, i.e., the situation that the scanned code is not recorded in the database, the code-scanning unit 110 is also used to determine whether the scanned code exists in the database server 200 after the scanning is completed, and if not exists, reports an error and triggers a further scanning; that is, the code-scanning unit 110 causes the interface of the handheld terminal 100 to display the interface for code scanning for the operator to select the continuation of a new code scanning or the stopping of code scanning based on the actual situation. For example, if the situation that the goods is inconsistent with the record is found when scanning the present goods during the stock transfer, it is possible to continue to scan the next goods to be transferred and transfers the same, but if there is no next goods to be transferred, the code scanning can be stopped.

Figure 2:
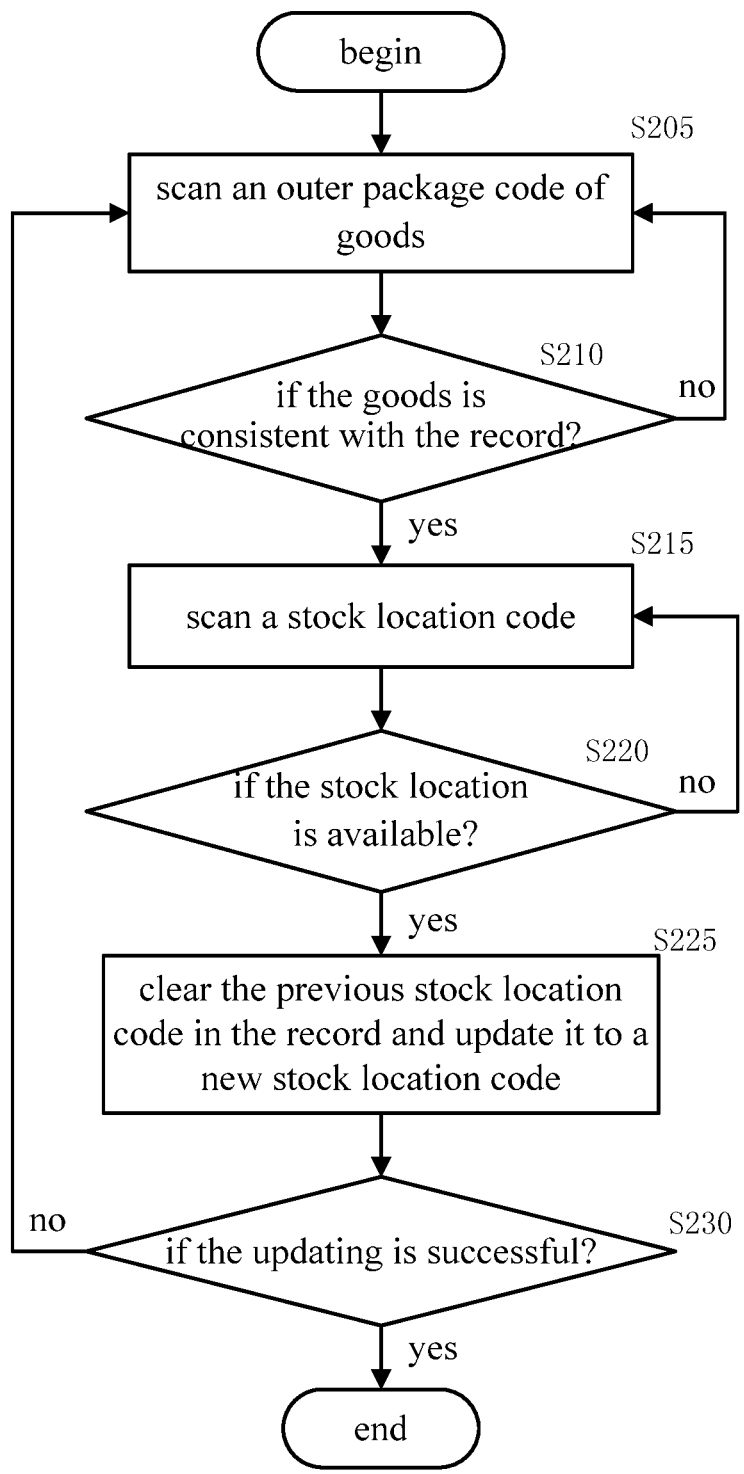
FIG. 2 is a schematic operational flowchart of a stock-transfer unit in the system in FIG. 1.

FIG. 2 illustrates steps of an optional stock transfer operation, wherein the code-scanning unit scans an outer package code of goods at step S205 after receiving a stock transfer instruction, and checks whether the goods is consistent with the record at step S210, if inconsistent, continues to scan the outer package code of the next goods to be transferred until the situation that the goods is consistent with the record occurs, and then starts the stock transfer operation. The code-scanning unit scans a new stock location code at step S215. The stock-transfer unit determines whether the new stock location is available at step S220, if available (the new stock location code is identified as an un-occupied state in the database), updates the previous stock location code in the stock data corresponding to the outer package code of goods to the new stock location code at step S225, if not available, re-scans a stock location code. If the updating succeeds at step S230, the operation ends; otherwise, the outer package code of goods is re-scanned.

Figure 3:
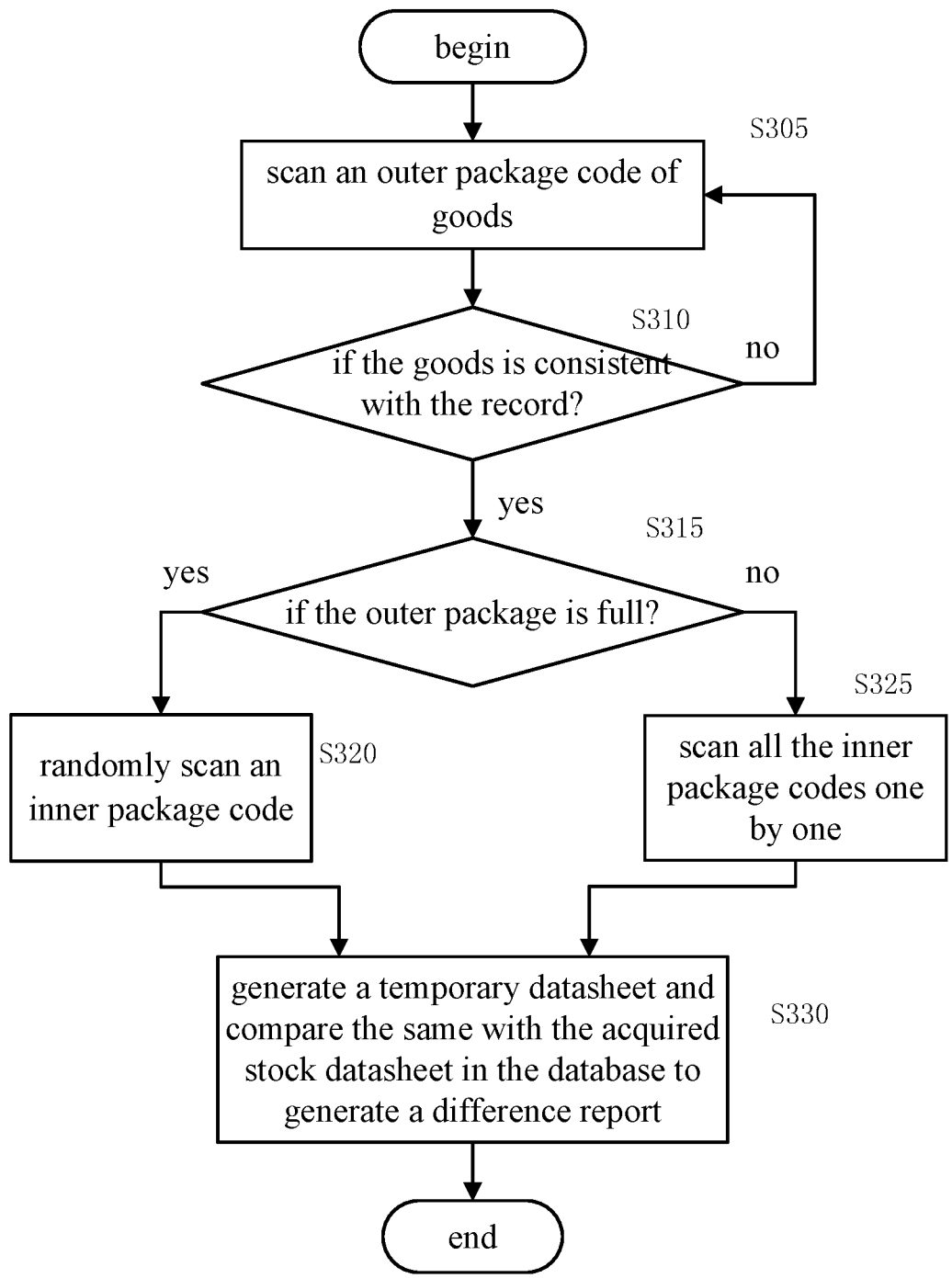
FIG. 3 is a schematic operational flowchart of an inventorying unit in the system in FIG. 1.

FIG. 3 illustrates steps of an optional inventorying operation, wherein the code-scanning unit scans an outer package code of goods at step S305 after receiving an inventorying instruction, and checks whether the goods is consistent with the record at step S310; if inconsistent, it re-scans, otherwise, the inventorying unit determines whether the outer package corresponding to the outer package code of goods is full at step S315, if it is full, randomly scans the inner package code of goods in one inner package within the outer package at step S320, and derives the inner package codes of all the goods corresponding to the outer package code of goods from the database server; and if it is not full, scans the inner package code of goods in all the inner packages in the outer package one by one at step S325, and at step S330, generates a temporary datasheet comprising the outer package code of goods, the inner package code of goods and the package relation record, acquires a currently stored stock datasheet comprising the outer package code of goods, the inner package code of goods and the package relation record from the database server, compares the temporary datasheet and the stock datasheet, and if there is a difference, generates a difference report.

Figure 4:
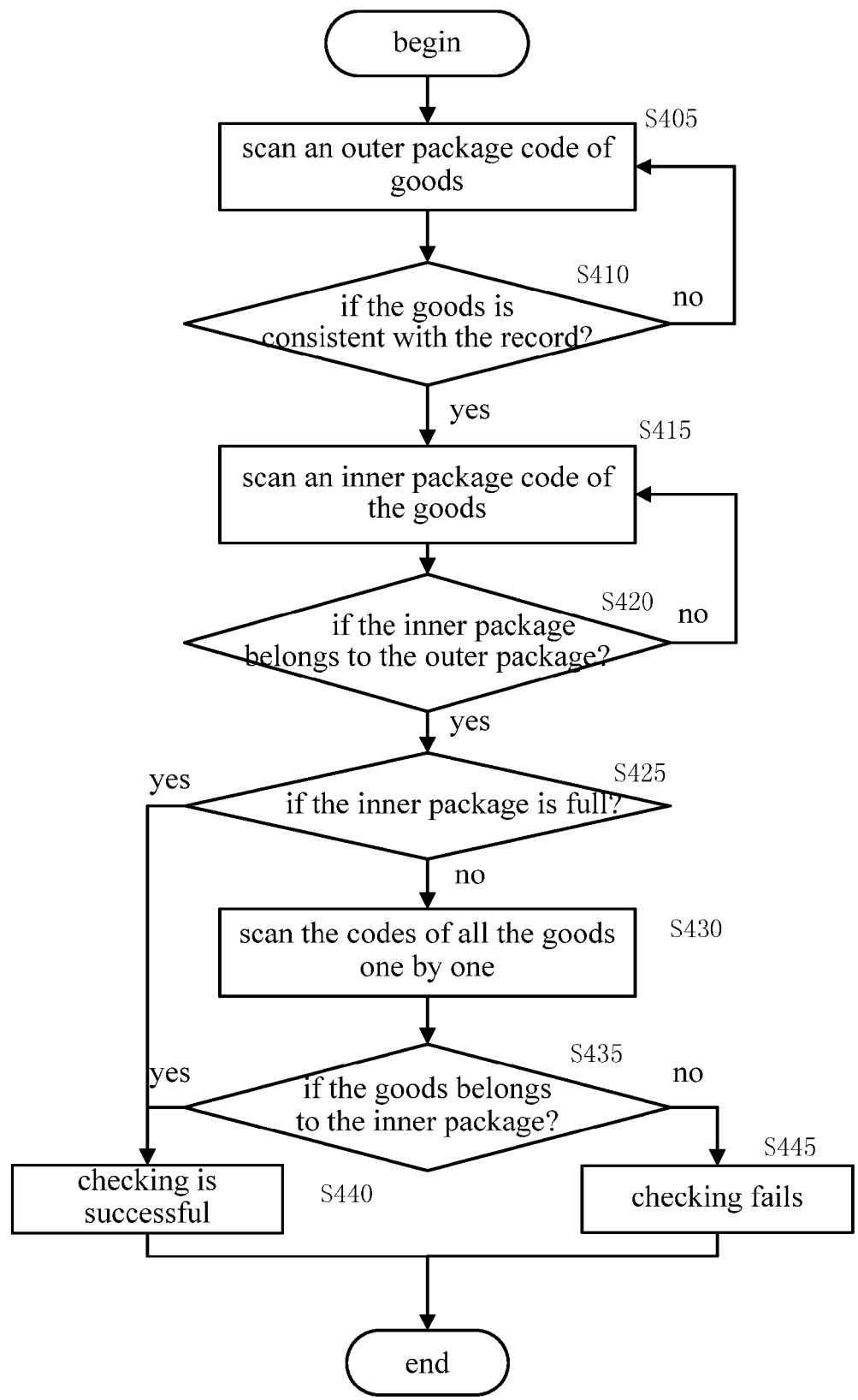
FIG. 4 is a schematic operational flowchart of a check unit in the system in FIG. 1.

FIG. 4 illustrates steps of an optional check operation, wherein the code-scanning unit scans an outer package code of goods at step S405 after receiving a check instruction, and checks whether the goods is in consistent with the record at step S410, if inconsistent, re-scans, if consistent, scans the inner package code of goods in the inner packages within the outer package at step S415, the check unit queries whether the packaging relation between the outer package code of goods and the inner package code of goods is correct in the database server (that is, whether it is also recorded in the database that the inner package is within the outer package) at step S420, if incorrect, it prompts a check failure, and if correct, it queries whether the inner package is full at step S425; if it is full, it prompts that check is successful at step S440, if it is not full, it triggers the code-scanning unit to scan the codes of all the goods in the inner package one by one at step S430 and determines whether the packaging relation between the goods and the inner package is correct at step S435, if correct, it prompts that the check is successful, otherwise, it prompts a check failure at step S445.

In the present embodiment, the handheld terminal is a palm computer, a pad computer or a smart phone. The code-scanning unit is a camera and a driving module thereof within those devices.

The above descriptions are only intended to illustrate the specific implementations of the present disclosure, and the protection scope of the present disclosure is not limited thereto. Modifications or replacements that can be easily devised by those skilled in the art within the technical scope of the present disclosure should all fall within the protection scope of the present disclosure. Therefore, the protection scope of the present disclosure should be defined by the claims.

The present application claims the priority of Chinese Patent Application No. 201410784087.6 filed on Dec. 16, 2014, and the entire content of which is incorporated as part of the present invention by reference.

What is claimed is:

1. A goods management system comprising a handheld terminal and a database server connected with each other via a wireless communication, wherein the handheld terminal is configured to scan goods information comprising at least one of an outer package code, an inner package code and a goods code, and acquire stock data including the goods information from the database server;

wherein the handheld terminal comprises a code-scanning unit and a data processing unit connected to the code-scanning unit, and the data processing unit comprises an inventorying unit connected to the code-scanning unit;

wherein the inventorying unit is configured to send an inventorying instruction to the code-scanning unit so that the code-scanning unit scans the outer package code;

the inventorying unit is further configured to receive the scanned outer package code from the code-scanning unit, query in the database server whether an outer package corresponding to the received outer package code is full, if the outer package is full, trigger the code-scanning unit to randomly scan an inner package code of an inner package within the outer package and derive inner package codes of all the inner packages within the outer package from the database server.

2. The goods management system according to claim 1, wherein the handheld terminal is further configured to scan stock location codes, and the stock data acquired from the database server further comprises the stock location codes;

wherein the code-scanning unit is further configured to transmit the scanned goods information and stock location codes to the data processing unit, and the data processing unit is connected to the database server and configured to perform data processing on the stock data according to the scanned goods information and stock location codes.

3. The goods management system according to claim 1, wherein the data processing unit comprises a stock-transfer unit connected to the code-scanning unit, wherein the stock-transfer unit is configured to send a stock-transfer instruction to the code-scanning unit, so that the code-scanning unit scans an outer package code corresponding to goods to be transferred and a new stock location code, and transmits the outer package code and the new stock location code to the stock-transfer unit, the stock-transfer unit transmits the outer package code and the new stock location code to the database server to allow the database server to update the previous stock location code in the stock data corresponding to the outer package code to the new stock location code.

4. The goods management system according to claim 3, wherein the stock-transfer unit is further configured to query whether the new stock location code is labeled as an occupied state in the database server before transmitting the outer package code and the new stock location code to the database server, and if it is labeled, the code-scanning unit is triggered to re-scan a new stock location code until a stock location which is not labeled as an occupied state is scanned.

5. The goods management system according to claim 1, wherein the code-scanning unit is further configured to scan the inner package code and sends the scanned outer package code and the inner package code to the inventorying unit; the inventorying unit is configured to establish a package relation record indicating that the inner package corresponding to the inner package code is within the outer package corresponding the outer package code, generate a temporary datasheet comprising the outer package code, the inner package code and the package relation record, acquire a currently stored stock datasheet comprising the outer package code, the inner package code and the package relation record from the database server, compare the temporary datasheet and the stock datasheet, and if there is a difference, generate a difference report.

6. The goods management system according to claim 5, wherein the inventorying unit is further configured, if the outer package is not full, to trigger the code-scanning unit to scan inner package codes of all the inner packages within the outer package one by one, and send the inner package codes of all the inner packages within the outer package to the inventorying unit.

7. The goods management system according to claim 1, wherein the data processing unit comprises a check unit connected to the code-scanning unit, the check unit is configured to send a check instruction to the code-scanning unit, so that the code-scanning unit transmits the scanned outer package code, inner package code and goods code to the check unit; the check unit is configured to query in the database server, determine whether the packaging relation record of the scanned outer package code, inner package code and the goods code is consistent with the packaging relation record in the database, and if inconsistent, prompt packaging error information.

8. The goods management system according to claim 7, wherein the check unit is configured, after the check unit receives the outer package code and the inner package code sent from the code-scanning unit, to query whether the packaging relation of the outer package code and the inner package code is correct in the database server, if incorrect, prompt a checking failure, and if correct, query whether the inner package is full, if it is full, the check unit is configured to prompt that the check is successful, if it is not full, the check unit is configured to trigger the code-scanning unit to scan the codes of all the goods in the inner package one by one and determine whether the packaging relation between the goods and the inner package is correct, if correct, prompt that the check is successful, otherwise, prompt check failure.

9. The goods management system according to claim 1, wherein the code-scanning unit is further configured to determine whether the scanned code exists in the database server after the scanning is completed, and if not exists, report an error and trigger to continue a scanning.

10. The goods management system according to claim 1, wherein the handheld terminal is a palm computer, a tablet computer or a smart phone.

11. A goods management method, comprising:
scanning, by a handheld terminal, goods information including at least one of an outer package code, an inner package code and a goods code; and
acquiring, from a database server connected to the handheld terminal via a wireless communication, stock data including the goods information;
wherein the handheld terminal comprises a code-scanning unit and a data processing unit connected to the code-scanning unit, and the data processing unit comprises an inventorying unit connected to the code-scanning unit;
wherein the inventorying unit is configured to send an inventorying instruction to the code-scanning unit so that the code-scanning unit scans the outer package code;
the inventorying unit is further configured to receive the scanned outer package code from the code-scanning unit, query in the database server whether an outer package corresponding to the received outer package code is full, if the outer package is full, trigger the code-scanning unit to randomly scan an inner package code of an inner package within the outer package and derive inner package codes of all the inner packages within the outer package from the database server.

12. The goods management method according to claim 11, wherein the handheld terminal is further configured to scan stock location codes, and the stock data acquired from the database server further comprises the stock location codes, and the data processing unit further comprises a stock-transfer unit connected to the code-scanning unit, and the goods management method further comprises:
scanning, by the code-scanning unit, an outer package code corresponding to goods to be transferred and a new stock location code according to a stock transfer instruction; and
transmitting, by the stock-transfer unit, the outer package code and the new stock location code to the database server so that the database server updates the previous stock location code in the stock data corresponding to the outer package code to the new stock location code.

13. The goods management method according to claim 11, further comprising:
scanning, by the code-scanning unit, the inner package code according to the inventorying instruction;
establishing, by the inventory unit, a package relation record indicating that an inner package corresponding to the inner package code is within an outer package corresponding to the outer package code;
generating, by the inventory unit, a temporary datasheet comprising the outer package code, the inner package code and the package relation record;
acquiring, by the inventory unit, a currently stored stock datasheet comprising the outer package code, the inner package code and the package relation record from the database server; and
comparing, by the inventory unit, the temporary datasheet and the stock datasheet, and if there is a different record, generating a difference report.

14. The goods management method according to claim 11, wherein the data processing unit further comprises a check unit connected to the code-scanning unit, and the goods management method further comprises:
scanning, by the code-scanning unit, the outer package code, the inner package code and the goods code according to a check instruction; and
inquiring, by the check unit, the database server, and determining whether the packaging relation record of the scanned outer package code, inner package code and the goods code is consistent with the packaging relation record in the database, and if inconsistent, prompting packaging error information.

* * * * *